R. GIBBONS.

Pantaloons.

No. 9,616. Reissued March 22, 1881.

Attest;

Geo. H. Graham

Jacob Felbel

Inventor,

Rodmond Gibbons

By

J. N. McIntire

Atty.

THE NORRIS PETERS CO., PHOTO-LITHO., WASHINGTON, D. C.

UNITED STATES PATENT OFFICE.

RODMOND GIBBONS, OF SAN FRANCISCO, CALIFORNIA.

PANTALOONS.

SPECIFICATION forming part of Reissued Letters Patent No. 9,616, dated March 22, 1881.

Original No. 178,287, dated June 6, 1876. Application for reissue filed February 19, 1881.

*To all whom it may concern:*

Be it known that I, RODMOND GIBBONS, of the city of San Francisco, in the State of California, have invented certain new and useful Improvements in Pantaloons and other Garments of a Similar Character; and I do hereby declare the following to be a full, clear, and exact description thereof, reference being had to the accompanying drawings, forming part of this specification.

My invention relates to means for strengthening the crotch in the fly of pantaloons, and has for its object to prevent that tension at the crotch of the fly which is ordinarily produced, either by continued use of the garment or by some undue strain upon the latter, caused by the assumption of some posture by the person wearing it or by some mode of removal of the garment from the body calculated to produce such an effect, and which tension frequently operates to rupture either the cloth or the seams, or both, at the vicinity of the said crotch.

To this end my invention consists in the use, in connection with the fly, of a check piece or strip of cloth or other inelastic pliable material, arranged to bridge over and protect from tensional strain the crotch of said fly, as will be hereinafter more fully described.

My said invention may be employed in the manufacture of all descriptions of pantaloons and other garments of a similar character, its application to such garments adding greatly to the durability of the fly portion thereof by preventing any stretch of the cloth or rupture of the stitching at the crotch of the fly.

To enable those skilled in manufacturing that kind of garments to which my invention is applicable to make and use them with my said invention embodied therein, I will now proceed to more fully describe it, referring by letters to the accompanying drawings, in which—

Figure 1:
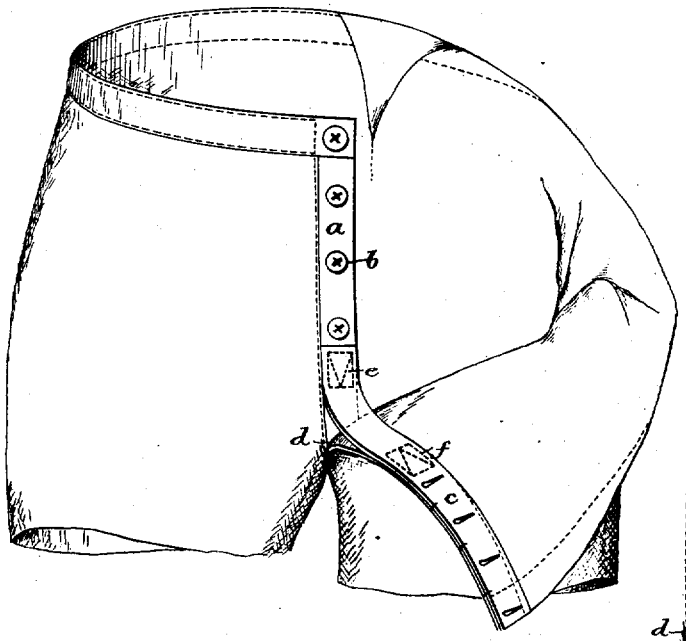
Figure 2:
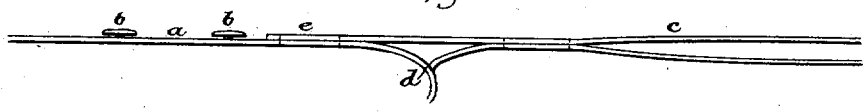
Figure 3:
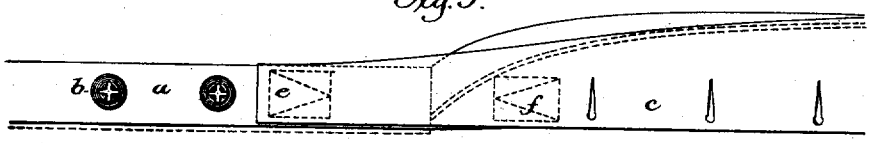

Figure 1 is a front view of the upper part of a pair of pantaloons representing the front of the fly as turned down for the purpose of more clearly illustrating the application thereto of my invention. Figs. 2 and 3 are, respectively, edge and face detail views of the fly portion only of the garment, drawn on an enlarged scale and with the fly distended, in order to more plainly show the improvement added thereto.

Figure 4:
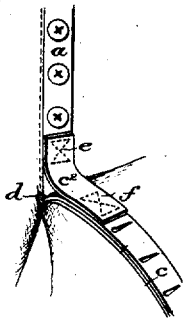

At Fig. 4 is shown a modified construction, in which the check-piece, instead of being integral with the button-hole strip, is composed of a separate piece of cloth.

In Figs. 1, 2, and 3 the button-strip of the fly is represented by *a* and the buttons by *b*. The button-hole strip is indicated by *c*, and between its button-holes it is stitched at points to the front of the garment in the ordinary way. The lower end of the button-hole strip *c* is not merely extended down into and fastened at the crotch *d*, as is the case in the common construction of pantaloons, but bridges over and extends beyond the crotch *d*, and is securely stitched to the button-strip *a*, as shown at *e*. The said button-hole strip is also very firmly secured to the garment below the lowest button-hole, as indicated at F.

At Fig. 4 is shown, instead of the preferred form of my invention, a construction in which a separate piece of cloth, $c^2$, serves as the bridge or check piece. This construction I consider as involving the broad scope of my invention; for, although in this form the button-hole strip has its lower end secured at the crotch *d*, the latter point is relieved of all strain when the fly is pulled open by the piece $c^2$, arranged as shown.

My improvement in the specific form seen at Figs. 1, 2, and 3, which show it carried out in the manner preferred by me, adds nothing to the cost of the garment, but, instead, rather cheapens its manufacture, since the attachment to the garment of the lower end of the button-hole strip is effected at a point more accessible than that at which the connection by stitching has heretofore been made.

It will be seen that in a pair of pantaloons made according to my invention, carried out in either of the forms shown, any extreme or sudden distention of the fly that would otherwise tend to strain and rupture it at the point *d* will come wholly upon the check-piece which extends across said point, and that thus the crotch *d* is perfectly protected against injury from the effects of any such strain.

Having now fully described my invention in both the shown forms in which it may be practiced, what I claim as new, and desire to secure by Letters Patent, is—

1. The combination, with the fly of a pair of pantaloons or other similar garment, of an inelastic bridge or check piece arranged across the crotch of the fly, and operating, substantially as described, to receive any strain occasioned by the spreading apart of the fly, and which would otherwise be exerted upon the crotch of the fly.

2. In combination with the fly portion of a pair of pantaloons or other similar garment, a check-piece made integral with the button-hole strip of the fly, and adapted to prevent any tension at the crotch *d* that might operate injuriously upon it.

In testimony whereof I hereto subscribe my name this 18th day of February, 1881.

RODMOND GIBBONS.

In presence of—
JACOB FELBEL,
H. JANVIER.